(12) United States Patent
Lee et al.

(10) Patent No.: US 12,506,159 B2
(45) Date of Patent: Dec. 23, 2025

(54) FUEL CELL STACK

(71) Applicants: HYUNDAI MOTOR COMPANY, Seoul (KR); Kia Corporation, Seoul (KR)

(72) Inventors: In Seok Lee, Yongin-si (KR); Dong Ho Ahn, Seoul (KR); Jeong Hee Park, Suwon-si (KR); In Yu Park, Seoul (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 499 days.

(21) Appl. No.: 18/124,727

(22) Filed: Mar. 22, 2023

(65) Prior Publication Data

US 2024/0204215 A1   Jun. 20, 2024

(30) Foreign Application Priority Data

Dec. 19, 2022  (KR) .................. 10-2022-0178617

(51) Int. Cl.
| | |
|---|---|
| *H01M 8/0258* | (2016.01) |
| *H01M 8/0267* | (2016.01) |
| *H01M 8/1004* | (2016.01) |

(52) U.S. Cl.
CPC ....... *H01M 8/0258* (2013.01); *H01M 8/0267* (2013.01); *H01M 8/1004* (2013.01)

(58) Field of Classification Search
CPC . H01M 8/0258; H01M 8/0267; H01M 8/1004
USPC ......... 429/400, 512, 72, 456, 457, 129, 146; 422/503
See application file for complete search history.

(56) References Cited

U.S. PATENT DOCUMENTS

| | | | | |
|---|---|---|---|---|
| 5,840,438 | A | * | 11/1998 | Johnson ............... H01M 8/0234 429/514 |
| 6,066,409 | A | * | 5/2000 | Ronne .................. H01M 8/242 429/469 |
| 7,709,128 | B2 | * | 5/2010 | Lee ..................... H01M 8/2483 429/514 |

(Continued)

FOREIGN PATENT DOCUMENTS

| | | | | |
|---|---|---|---|---|
| EP | 3240079 A1 | * | 11/2017 | ........ H01M 8/04156 |
| JP | 2004186138 A | * | 7/2004 | ............. H01M 8/02 |

(Continued)

*Primary Examiner* — Patricia L. Hailey
(74) *Attorney, Agent, or Firm* — MORGAN, LEWIS & BOCKIUS LLP (57) ABSTRACT

An embodiment of the present disclosure relates to a fuel cell stack including a membrane electrode assembly (MEA), a first separator stacked on the MEA and including a reaction channel disposed on one surface of the first separator facing the MEA and configured to allow a reactant gas to flow therethrough, and a cooling channel disposed on the other surface of the first separator and configured to allow a cooling gas to flow therethrough, and inclined guide holes formed through the first separator and inclined with respect to a thickness direction of the first separator, the inclined guide holes each having one end communicating with the cooling channel, and the other end communicating with the reaction channel, thereby obtaining an advantageous effect of improving performance and operational efficiency.

12 Claims, 7 Drawing Sheets

(56) References Cited

U.S. PATENT DOCUMENTS

| | | | |
|---|---|---|---|
| 7,901,826 B2* | 3/2011 | Yoshida | H01M 8/241 |
| | | | 429/456 |
| 10,847,816 B2 | 11/2020 | Takehiro et al. | |
| 2003/0129474 A1* | 7/2003 | Kikuchi | H01M 8/0258 |
| | | | 429/434 |
| 2003/0203272 A1* | 10/2003 | Kelly | H01M 8/04089 |
| | | | 429/457 |
| 2007/0207372 A1* | 9/2007 | Kikuchi | H01M 8/1007 |
| | | | 429/514 |
| 2007/0254203 A1* | 11/2007 | Ishida | H01M 8/2483 |
| | | | 429/457 |
| 2009/0269630 A1* | 10/2009 | Katano | H01M 8/04335 |
| | | | 429/457 |
| 2011/0244369 A1* | 10/2011 | Kondo | H01M 8/0258 |
| | | | 429/513 |
| 2017/0317362 A1 | 11/2017 | Takehiro et al. | |
| 2021/0296660 A1* | 9/2021 | Hu | H01M 8/0263 |
| 2023/0058717 A1* | 2/2023 | Glueck | H01M 8/2483 |
| 2025/0140877 A1* | 5/2025 | Sahu | B60L 50/72 |

FOREIGN PATENT DOCUMENTS

| | | | | |
|---|---|---|---|---|
| JP | 2006108009 A | * | 4/2006 | H01M 8/02 |
| JP | 2008027748 A | * | 2/2008 | H01M 8/02 |
| JP | 6402740 B2 | | 10/2018 | |

* cited by examiner

FUEL CELL STACK

CROSS-REFERENCE TO RELATED APPLICATION

This application claims priority to and the benefit of Korean Patent Application No. 10-2022-0178617 filed in the Korean Intellectual Property Office on Dec. 19, 2022, the entire contents of which are incorporated herein by reference.

TECHNICAL FIELD

The present disclosure relates to a fuel cell stack, and more particularly, to a fuel cell stack with improved performance and operational efficiency.

BACKGROUND ART

A fuel cell stack refers to a kind of power generation device that generates electrical energy through a chemical reaction of fuel (e.g., hydrogen), and the fuel cell stack may be configured by stacking several tens or hundreds of fuel cells (unit cells) in series.

The fuel cell may include a membrane electrode assembly (MEA) having an electrolyte membrane configured to allow hydrogen positive ions to move therethrough, and electrodes (catalyst electrode layers) coupled to two opposite surfaces of the electrolyte membrane and configured to enable a reaction between hydrogen and oxygen. The fuel cell may also include gas diffusion layers (GDLs) stacked on two opposite surfaces of the membrane electrode assembly and configured to distribute reactant gases and transfer the generated electrical energy, and separators (bipolar plates) stacked on the gas diffusion layers and configured to define flow paths (channels).

In addition, the separators may also serve to distribute heat, which is generated in the fuel cell (unit cell), to the entire fuel cell, and the excessively generated heat may be discharged to the outside by a cooling medium flowing along cooling channels between the separators.

Recently, various attempts have been made to apply the fuel cell stack to aerial mobility vehicles such as airplanes and drones as well as automobiles.

Meanwhile, a weight of the aerial mobility vehicle needs to be minimized to increase an output and a flight section of the aerial mobility vehicle.

A method of using outside air (an air-cooled method) instead of a coolant (a water-cooled method) as a cooling medium for removing heat generated from the fuel cell stack has been proposed as a solution for reducing the weight of the aerial mobility vehicle.

However, there is a problem in that it is difficult for an air-cooled cooling method using air to ensure sufficient performance and efficiency in cooling the fuel cell stack.

In addition, humidity of the membrane electrode assembly (humidity of the electrolyte membrane) needs to be appropriately maintained to normally (efficiently) operate the fuel cell stack. If the fuel cell stack is not sufficiently cooled, it is difficult to appropriately maintain the humidity of the membrane electrode assembly because of an overheating reaction. For this reason, there is a problem in that the performance and operational efficiency of the fuel cell stack deteriorate.

Therefore, recently, various studies have been conducted to ensure the performance in cooling the fuel cell stack and improve the performance and operational efficiency, but the study results are still insufficient. Accordingly, there is a need to develop a technology to ensure the performance in cooling the fuel cell stack and improve the performance and operational efficiency.

SUMMARY

The present disclosure has been made in an effort to provide a fuel cell capable of improving performance (output) and operational efficiency of a fuel cell stack.

In particular, the present disclosure has been made in an effort to ensure cooling performance and cooling efficiency and improve performance and operational efficiency of the fuel cell stack.

Among other things, the present disclosure has been made in an effort to appropriately maintain humidity of a membrane electrode assembly by using cooling gas.

The present disclosure has also been made in an effort to simplify a structure and a manufacturing process and reduce manufacturing costs.

The present disclosure has also been made in an effort to minimize deformation of and damage to a membrane electrode assembly and improve durability.

The present disclosure has also been made in an effort to improve stability and reliability.

The objects to be achieved by the embodiments are not limited to the above-mentioned objects, but also include objects or effects that may be understood from the solutions or embodiments described below.

According to an embodiment of the present disclosure, a fuel cell stack including: a membrane electrode assembly (MEA); a first separator stacked on the MEA and including a reaction channel disposed on one surface of the first separator facing the membrane electrode assembly and configured to allow a reactant gas to flow therethrough, and a cooling channel disposed on the other surface of the first separator and configured to allow a cooling gas to flow therethrough; and inclined guide holes formed through the first separator and inclined with respect to a thickness direction of the first separator, the inclined guide holes each having one end communicating with the cooling channel, and the other end communicating with the reaction channel.

This is to improve performance and operational efficiency of the fuel cell stack.

That is, humidity of the membrane electrode assembly (humidity of the electrolyte membrane) needs to be appropriately maintained to normally (efficiently) operate the fuel cell stack. If the fuel cell stack is not sufficiently cooled, it is difficult to appropriately maintain the humidity of the membrane electrode assembly because of an overheating reaction. For this reason, there is a problem in that the performance and operational efficiency of the fuel cell stack deteriorate.

To address this problem, in the embodiment of the present disclosure, the inclined guide holes are provided in the first separator, and a part of the cooling gas flowing along the cooling channels is supplied to the reaction channels via the inclined guide holes, such that the cooling gas (cold air) may come into direct contact with the membrane electrode assembly and cool the membrane electrode assembly. Therefore, it is possible to obtain an advantageous effect of ensuring the cooling performance and cooling efficiency and improving the performance and operational efficiency of the fuel cell stack.

Among other things, according to the embodiment of the present disclosure, a flow of condensate water flowing along the reaction channels is temporarily restricted by the cooling gas supplied to the reaction channels via the inclined guide holes, such that a point in time at which the condensate water is discharged may be delayed. Therefore, it is possible to obtain an advantageous effect of maintaining appropriate humidity of the membrane electrode assembly and improving the performance and operational efficiency of the fuel cell stack.

According to the embodiment of the present disclosure, the reactant gas in the reaction channel may flow in a first direction, and the cooling gas in the cooling channel may flow in a second direction opposite to the first direction.

According to the embodiment of the present disclosure, the inclined guide hole may be inclined upward with respect to a direction in which the cooling gas flows in the cooling channel, based on the cooling channel positioned below the reaction channel, and a part of the cooling gas flowing along the cooling channel may be supplied to the reaction channel via the inclined guide hole.

According to the exemplary embodiment of the present disclosure, the fuel cell stack may include a second separator stacked on the first separator while facing the cooling channel.

According to the exemplary embodiment of the present disclosure, the fuel cell stack may include a first protrusion pattern arranged at a position corresponding to a position of one of the inclined guide holes and protruding from one surface of the second separator that faces the first separator.

As described above, in the embodiment of the present disclosure, the first protrusion pattern is provided below the inclined guide hole based on the cooling channel positioned below the reaction channel, such that a flow velocity and momentum of the cooling gas (cold air) supplied to the reaction channel via the inclined guide hole may be increased. Therefore, it is possible to obtain an advantageous effect of further improving a cooling effect implemented by the cooling gas and further improving an effect of delaying the discharge of the condensate water.

The first protrusion pattern may be provided in various ways in accordance with required conditions and design specifications.

According to the embodiment of the present disclosure, the first protrusion pattern may be provided by partially processing a part of the second separator.

Because the first protrusion pattern is provided by partially forming a part of the second separator as described above, it is possible to obtain an advantageous effect of simplifying the structure and manufacturing process and reducing costs required to provide the first protrusion pattern.

According to the embodiment of the present disclosure, the reactant gas in the reaction channel may flow in a first direction, and the cooling gas in the cooling channel may flow in the first direction.

According to the embodiment of the present disclosure, the inclined guide holes may include: a first inclined guide hole formed through the first separator and inclined upward with respect to a direction in which the cooling gas flows in the cooling channel, based on the cooling channel positioned below the reaction channel; and a second inclined guide hole positioned downstream from the first inclined guide hole in the direction in which the reactant gas flows in the reaction channel, the second inclined guide hole being formed through the first separator and inclined downward with respect to the direction in which the reactant gas flows in the reaction channel, based on the cooling channel positioned below the reaction channel.

As described above, in the embodiment of the present disclosure, the first inclined guide hole is provided in the first separator, and a part of the cooling gas flowing along the cooling channel is supplied to the reaction channel via the first inclined guide hole, such that the cooling gas (cold air) may come into direct contact with the membrane electrode assembly and cool the membrane electrode assembly. Therefore, it is possible to obtain an advantageous effect of inhibiting overheating of the membrane electrode assembly and improving the performance and operational efficiency of the fuel cell stack.

In addition, in the embodiment of the present disclosure, the second inclined guide hole is provided in the first separator, and the condensate water produced in the reaction channel is discharged to the cooling channel via the second inclined guide hole. Therefore, it is possible to obtain an advantageous effect of inhibiting flooding caused by the excessive amount of condensate water produced in the reaction channel and improving the performance and operational efficiency of the fuel cell stack.

This is based on the fact that when the fuel cell stack operates in a high-current density region, the flooding may occur because the production amount of condensate water is relatively large. In the embodiment of the present disclosure, the condensate water produced in the reaction channel is discharged to the cooling channel via the second inclined guide hole. Therefore, it is possible to obtain an advantageous effect of inhibiting the flooding caused by the excessive amount of condensate water and improving the performance and operational efficiency of the fuel cell stack.

According to the embodiment of the present disclosure, the fuel cell stack may include: a second separator stacked on the first separator while facing the cooling channel; and a first protrusion pattern arranged at a position corresponding to a position of the first inclined guide hole and protruding from one surface of the second separator that faces the first separator.

As described above, in the embodiment of the present disclosure, the first protrusion pattern is provided below the first inclined guide hole based on the cooling channel positioned below the reaction channel, such that a flow velocity and momentum of the cooling gas (cold air) supplied to the reaction channel via the first inclined guide hole may be increased. Therefore, it is possible to obtain an advantageous effect of further improving a cooling effect implemented by the cooling gas and further improving an effect of delaying the discharge of the condensate water.

According to the embodiment of the present disclosure, the first protrusion pattern may be provided by partially processing a part of the first separator.

Because the first protrusion pattern is provided by partially forming a part of the first separator as described above, it is possible to obtain an advantageous effect of simplifying the structure and manufacturing process and reducing costs required to provide the first protrusion pattern.

According to the embodiment of the present disclosure, the fuel cell stack may include a second protrusion pattern disposed adjacent to the second inclined guide hole and protruding from the other surface of the first separator.

As described above, in the embodiment of the present disclosure, the second protrusion pattern is provided adjacent to the second inclined guide hole, such that pressure at the periphery of the outlet end of the second inclined guide hole (a region downstream from the second protrusion pattern) may be decreased on the basis of the Bernoulli's principle, which may ensure a smooth discharge of the condensate water. Therefore, it is possible to obtain an advantageous effect of further improving efficiency in discharging the condensate water from the reaction channel to the cooling channel.

The second protrusion pattern may be provided in various ways in accordance with required conditions and design specifications.

According to the exemplary embodiment of the present disclosure, the second protrusion pattern may be provided by partially processing a part of the first separator.

Because the second protrusion pattern is provided by partially forming a part of the first separator as described above, it is possible to obtain an advantageous effect of simplifying the structure and manufacturing process and reducing costs required to provide the second protrusion pattern.

DETAILED DESCRIPTION

Hereinafter, exemplary embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 7, a fuel cell stack 10 according to various embodiments of the present disclosure includes: a membrane electrode assembly (MEA) 100; a first separator 200 stacked on the membrane electrode assembly 100 and including reaction channels 210 provided along one surface of the of the first separator 200 facing the membrane electrode assembly 100 and configured to allow reactant gases RA to flow therethrough, and cooling channels 220 provided along the other surface of the first separator 200 and configured to allow a cooling gas CA to flow therethrough; and inclined guide holes 230 formed through the first separator 200 and inclined with respect to a thickness direction of the first separator 200, the inclined guide holes 230 each having one end communicating with the cooling channel 220, and the other end communicating with the reaction channel 210.

For reference, the fuel cell stack 10 according to the embodiment of the present disclosure may be applied to various mobility vehicles such as automobiles, ships, and airplanes. The present disclosure is not restricted or limited by the types and properties of subjects (mobility vehicles) to which the fuel cell stack 10 is applied. Hereinafter, an example will be described in which the fuel cell stack 10 according to the embodiment of the present disclosure is applied to an aerial mobility vehicle.

The fuel cell stack 10 refers to a kind of power generation device that generates electrical energy through a chemical reaction of fuel (e.g., hydrogen). The fuel cell stack may be configured by stacking several tens or hundreds of fuel cells (unit cells) (not illustrated) in series.

The fuel cell (unit cell) may include a reaction layer (not illustrated), and the first separator 200 and a second separator 300 respectively stacked on two opposite sides of the reaction layer. The fuel cell stack may be configured by stacking the plurality of fuel cells in a reference direction and then assembling end plates (not illustrated) to the two opposite ends of the plurality of fuel cells.

More specifically, the reaction layer may include the membrane electrode assembly (MEA) 100, and gas diffusion layers (GDLs) (not illustrated) being in close contact with two opposite sides of the membrane electrode assembly 100.

The membrane electrode assembly (MEA) 100 is configured to generate electricity through an oxidation-reduction reaction between fuel (e.g., hydrogen), which is a first reactant gas, and an oxidant (e.g., air) which is a second reactant gas.

The membrane electrode assembly 100 may be variously changed in structure and material in accordance with required conditions and design specifications, and the present disclosure is not limited or restricted by the structure and material of the membrane electrode assembly 100.

For example, the membrane electrode assembly 100 includes an electrolyte membrane through which hydrogen ions move, and catalyst electrode layers attached to two opposite surfaces of the electrolyte membrane, and the electrochemical reactions occur in the catalyst electrode layers.

The gas diffusion layers (GDLs) are stacked on two opposite sides of the membrane electrode assembly 100 and serve to uniformly distribute the reactant gases RA and transfer the generated electrical energy.

The gas diffusion layer may have a porous structure having pores each having a predetermined size.

The sizes of the pores and the material of the gas diffusion layer may be variously changed in accordance with required conditions and design specifications. The present disclosure is not limited or restricted by the sizes of the pores and the material of the gas diffusion layer.

The first separator 200 and the second separator 300 are configured to supply the reactant gases RA (e.g., hydrogen and air) to the membrane electrode assembly 100 and disposed to be in close contact with one surface and the other surface of the membrane electrode assembly 100 based on a direction in which the fuel cells are stacked.

Figure 2:
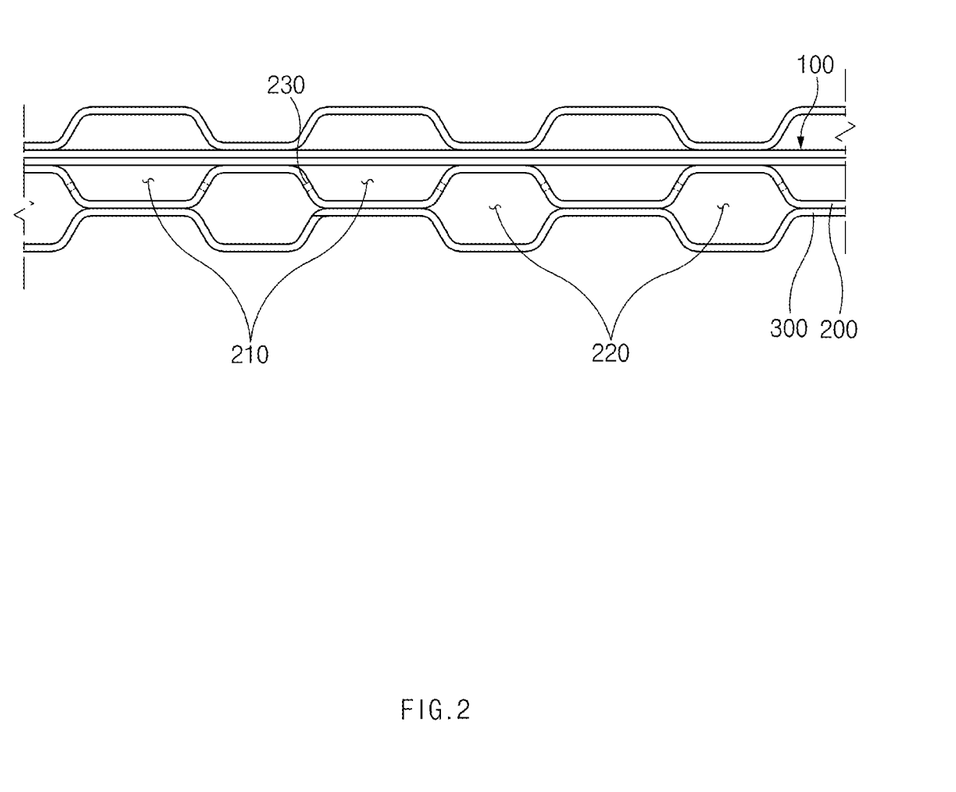
FIGS. 2 and 3 are views for explaining inclined guide holes of the fuel cell stack according to the embodiment of the present disclosure.

For example, based on FIG. 2, the separators (the first separator and the second separator) may be stacked on lower and upper surfaces of the membrane electrode assembly 100, respectively.

More specifically, the first separator 200 (cathode separator) is in close contact with one surface (the lower surface based on FIG. 2) of the membrane electrode assembly 100. The reaction channels 210 are provided along one surface (an upper surface based on FIG. 2) of the first separator 200 that faces the membrane electrode assembly 100, and the reactant gas RA (air) flows through the reaction channels 210. The cooling channels 220 are provided along the other surface (a lower surface based on FIG. 2) of the first separator 200, and the cooling gas CA (cooling air) flows through the cooling channels 220.

The second separator 300 (anode separator) is stacked on the first separator 200 so that the second separator 300 is in close contact with the other surface (the upper surface based on FIG. 2) of the membrane electrode assembly 100 and faces the cooling channels 220 of the first separator 200. Reaction channels (not illustrated) are provided along one surface (a lower surface based on FIG. 2) of the second separator 300 that faces the membrane electrode assembly 100, and the reactant gas (hydrogen, H) flows through the reaction channels 210. Cooling channels (not illustrated) are provided along the other surface (an upper surface based on FIG. 2) of the second separator 300, and the cooling gas (cooling air) flows through the cooling channels 220.

The first and second separators 200 and 300 may be made of various materials in accordance with required conditions and design specifications. The present disclosure is not restricted or limited by the materials of the first and second separators 200 and 300.

For example, the first and second separators 200 and 300 may each be made of thin-film metal (e.g., stainless, Inconel, or aluminum). The first and second separators 200 and 300, together with the reaction layer, may constitute the single fuel cell (unit cell) and independently define the flow paths for hydrogen, air, and a coolant. According to another embodiment of the present disclosure, the first and second separators 200 and 300 may each be made of other materials such as graphite or a carbon composite.

For reference, hydrogen, which is the fuel, and air, which is the oxidant, are supplied to an anode (not illustrated) and a cathode (not illustrated) of the membrane electrode assembly 100, respectively, through the reaction channels 210 of the first and second separators (the cathode separator and the anode separator) 200 and 300. The hydrogen may be supplied to the anode, and the air may be supplied to the cathode.

The hydrogen supplied to the anode is decomposed into hydrogen ions (protons) and electrons by catalysts in the electrode layers disposed at two opposite sides of the electrolyte membrane. Only the hydrogen ions are selectively delivered to the cathode through the electrolyte membrane, which is a positive ion exchange membrane, and at the same time, the electrons are delivered to the cathode through the gas diffusion layer and the separators (the first and second separators) which are conductors.

At the cathode, the hydrogen ions supplied through the electrolyte membrane and the electrons transmitted through the separator meet oxygen in the air supplied to the cathode by an air supply device, thereby creating a reaction of producing water. As a result of the movement of the hydrogen ions, the electrons flow through external conductive wires, and the electric current is generated as a result of the flow of the electrons.

Meanwhile, the fuel cell stack 10 may be configured to operate under various operating conditions in accordance with required conditions and design specifications.

Figure 3:
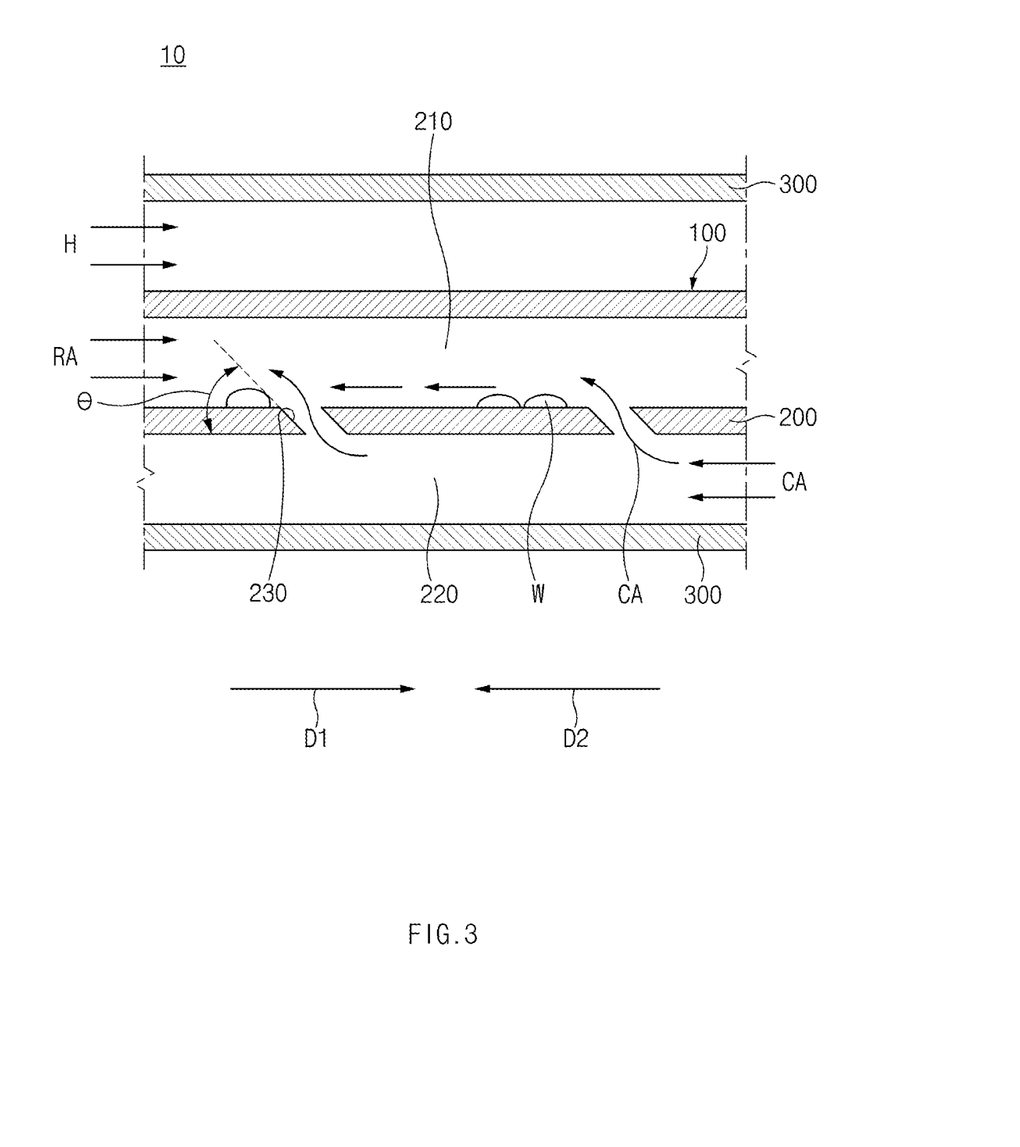

For example, referring to FIG. 3, the fuel cell stack 10 may be configured to operate in a low-current density region. The reactant gas RA in the reaction channel 210 may flow in a first direction D1 (from the left side to the right side based on FIG. 3). The cooling gas CA in the cooling channel 220 may flow in a second direction D2 (from the right side to the left side based on FIG. 3) opposite to the first direction D1.

Figure 1:
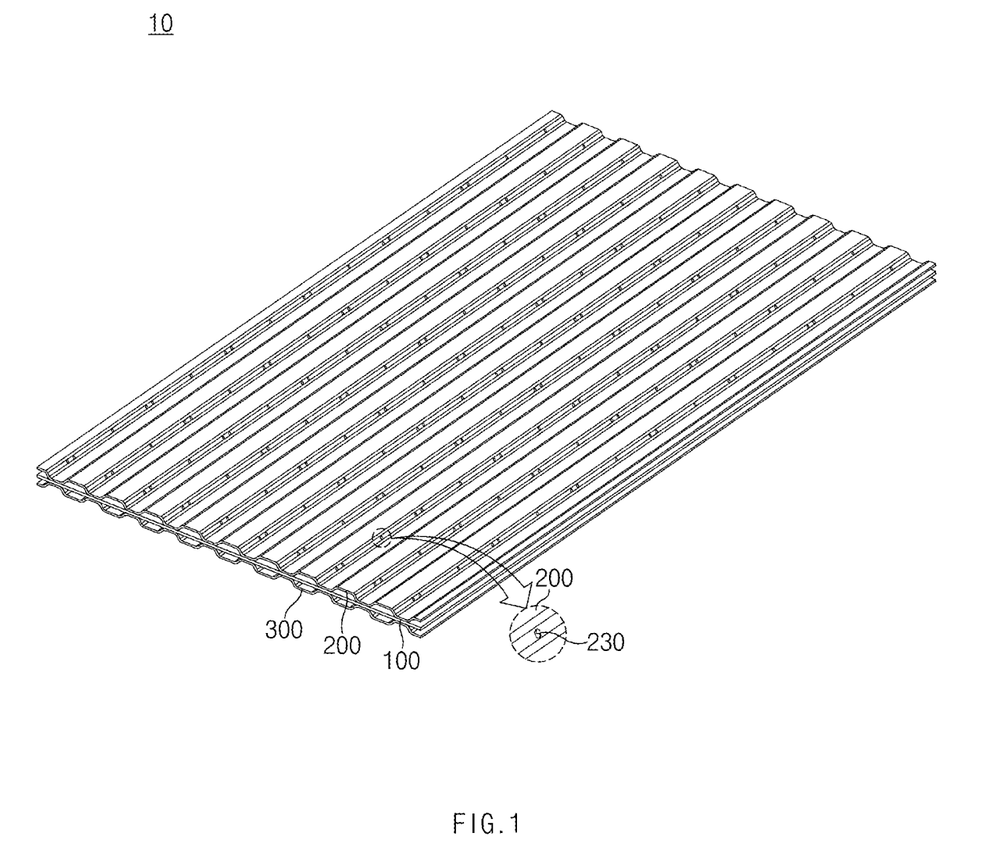
FIG. 1 is a view for explaining a fuel cell stack according to an embodiment of the present disclosure.

Referring to FIGS. 1 to 3, the inclined guide hole 230 is formed through the first separator 200 and inclined with respect to the thickness direction of the separator. The inclined guide hole 230 has one end communicating with the cooling channels 220, and the other end communicating with the reaction channels 210.

The inclined guide hole 230 is configured to supply the reaction channel 210 with a part of the cooling gas CA that flows along the cooling channel 220. The present disclosure is not restricted or limited by the structure of the inclined guide hole 230 and the number of inclined guide holes 230.

For example, the inclined guide hole 230 may be provided in the form of a circular hole having a circular cross-section. The plurality of inclined guide hole 230 may be provided in all the sections of the reaction channels 210 and spaced apart from one another in a longitudinal direction of the reaction channel 210.

Further, an angle $\theta$ of the inclined guide hole 230 may be variously changed in accordance with required conditions and design specifications. The present disclosure is not restricted or limited by the angle $\theta$ of the inclined guide hole 230.

According to another embodiment of the present disclosure, the inclined guide hole may have a quadrangular cross-section or other cross-sectional shapes.

Further, in the embodiment of the present disclosure illustrated and described above, the example has been described in which the inclined guide holes 230 are provided in all the sections of the reaction channels 210. However, according to another embodiment of the present disclosure, the inclined guide holes may be partially provided only in a particular section of the reaction channel (e.g., a section disposed adjacent to an outlet end of the reaction channel).

According to the exemplary embodiment of the present disclosure, based on the cooling channel 220 positioned at a lower side of the reaction channel 210, the inclined guide hole 230 is inclined upward with respect to a direction in which the cooling gas CA flows in the cooling channel 220. A part of the cooling gas CA flowing along the cooling channel 220 may be supplied to the reaction channel 210 via the inclined guide hole 230.

In this case, the configuration in which the inclined guide hole 230 is inclined upward with respect to the direction in which the cooling gas CA flows in the cooling channel 220 based on the cooling channel 220 positioned at the lower side of the reaction channel 210 may be understood as a configuration in which the inclined guide hole 230 is inclined (inclined upward and leftward based on FIG. 3) so that an outlet end of the inclined guide hole 230 is positioned downstream from an inlet end of the inclined guide hole 230 in the direction in which the cooling gas CA flows in the cooling channel 220.

As described above, in the embodiment of the present disclosure, the inclined guide holes 230 may be provided in the first separator 200, and a part of the cooling gas CA flowing along the cooling channels 220 may be supplied to the reaction channels 210 via the inclined guide holes 230, such that the cooling gas CA (cold air) may come into direct contact with the membrane electrode assembly 100 and cool the membrane electrode assembly 100. Therefore, it is possible to obtain an advantageous effect of inhibiting overheating of the membrane electrode assembly 100 and improving the performance and operational efficiency of the fuel cell stack 10.

Moreover, according to the embodiment of the present disclosure, a flow of condensate water W flowing along the reaction channels 210 may be temporarily restricted by the cooling gas CA supplied to the reaction channels 210 via the inclined guide holes 230, such that a point in time at which the condensate water W is discharged may be delayed. Therefore, it is possible to obtain an advantageous effect of maintaining appropriate humidity of the membrane electrode assembly 100 and improving the performance and operational efficiency of the fuel cell stack 10.

That is, the condensate water W produced in the reaction channel 210 may be discharged while flowing together with the reactant gas RA in the flow direction (first direction) of the reactant gas RA. In the embodiment of the present disclosure, the cooling gas CA may be supplied to a bottom portion of the reaction channel 210 in a direction opposite to the flow direction of the condensate water W (the flow direction of the reactant gas) in order to delay the discharge of the condensate water W, such that a residence time for which the condensate water W remains in the reaction channel 210 may be further extended. Therefore, it is possible to obtain an advantageous effect of improving the humidity of the membrane electrode assembly 100.

This is based on the fact that when the fuel cell stack 10 operates in the low-current density region, the production amount of condensate water W is relatively small, which may cause a situation in which the membrane electrode assembly 100 is dried. In the embodiment of the present disclosure, the time for which the condensate water W remains in the reaction channel 210 is extended, which makes it possible to obtain an effect similar to an effect of increasing the production amount of condensate water W even though the amount of condensate water W produced in the reaction channel 210 is somewhat small. Therefore, it is possible to obtain an advantageous effect of minimizing a degree to which the membrane electrode assembly 100 is dried.

Figure 4:
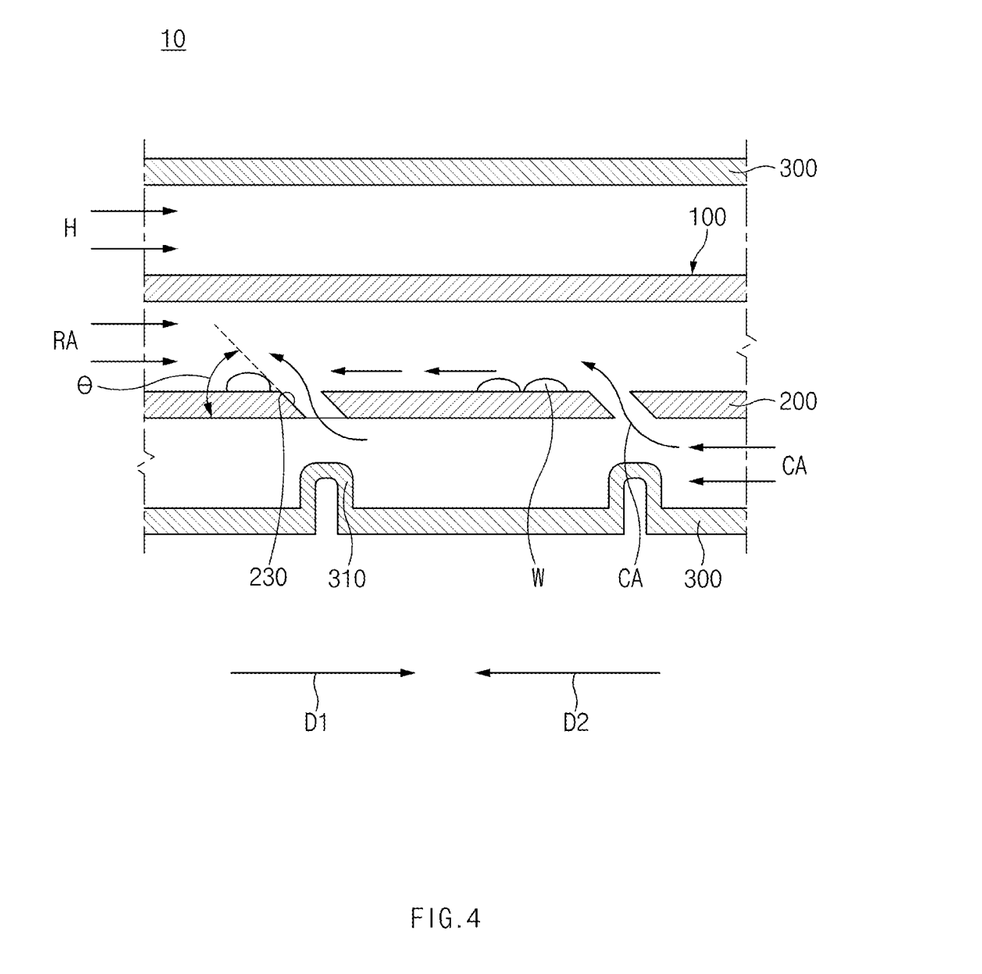
FIG. 4 is a view for explaining a first protrusion pattern of the fuel cell stack according to the embodiment of the present disclosure.

Referring to FIG. 4, according to the exemplary embodiment of the present disclosure, the fuel cell stack 10 may include the second separator 300 (anode separator) stacked on the first separator 200 while facing the cooling channels 220 and include first protrusion patterns 310 arranged at positions corresponding to positions of the respective inclined guide holes 230 and protruding from one surface (the upper surface based on FIG. 4) of the second separator 300 that faces the first separator 200.

The first protrusion pattern 310 may have various structures in accordance with required conditions and design specifications. The present disclosure is not restricted or limited by the structure of the first protrusion pattern 310 and the number of first protrusion patterns 310.

For example, the first protrusion pattern 310 may be disposed below the inclined guide hole 230 and provided in the form of an approximately straight protrusion.

According to another embodiment of the present disclosure, the first protrusion pattern 310 may have an inclined surface, and the cooling gas, which comes into contact with the first protrusion pattern 310, may be introduced into the inclined guide hole 230 along the inclined surface.

The first protrusion pattern 310 may be provided in various ways in accordance with required conditions and design specifications.

According to the exemplary embodiment of the present disclosure, the first protrusion pattern 310 may be provided by partially processing (e.g., forming) a part of the second separator 300.

Because the first protrusion pattern 310 is provided by partially forming a part of the second separator 300 (for example, made of a metallic material) as described above, it is possible to obtain an advantageous effect of simplifying the structure and manufacturing process and reducing costs required to provide the first protrusion pattern 310.

According to another embodiment of the present disclosure, the first protrusion pattern 310 may be separately manufactured and then attached or coupled to the second separator 300.

As described above, in the embodiment of the present disclosure, the first protrusion pattern 310 is disposed below the inclined guide hole 230 based on the cooling channel 220 positioned below the reaction channel 210, such that a flow velocity and momentum of the cooling gas CA (cold air) supplied to the reaction channel 210 via the inclined guide hole 230 may be increased. Therefore, it is possible to obtain an advantageous effect of further improving a cooling effect implemented by the cooling gas CA and further improving an effect of delaying the discharge of the condensate water W.

Meanwhile, in the embodiment of the present disclosure illustrated and described above, the example has been described in which the fuel cell stack 10 operates in the low-current density region, and the flow direction of the reactant gas RA and the flow direction of the cooling gas CA are opposite to each other. However, according to another embodiment of the present disclosure, the fuel cell stack 10 may operate in a high-current density region, and the flow direction of the reactant gas RA and the flow direction of the cooling gas CA are identical to each other.

Figure 5:
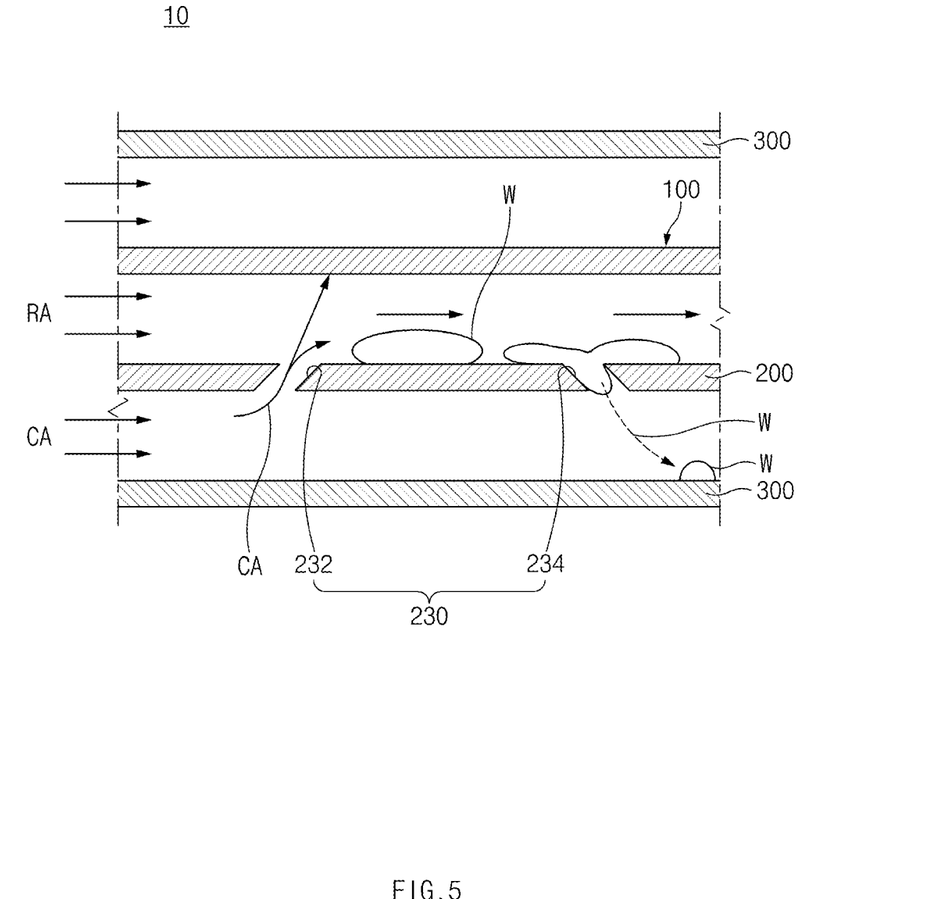
FIG. 5 is a view for explaining a fuel cell stack according to another embodiment of the present disclosure.
Figure 6:
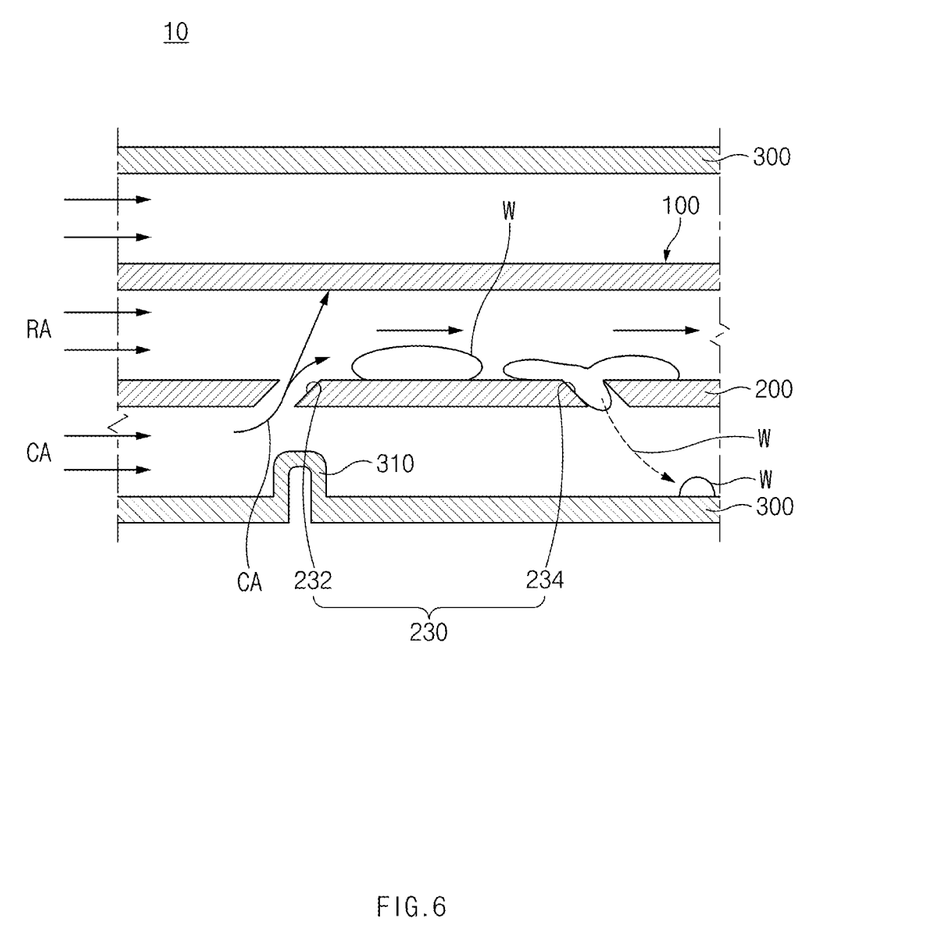
FIG. 6 is a view for explaining a first protrusion pattern of the fuel cell stack according to another embodiment of the present disclosure.
Figure 7:
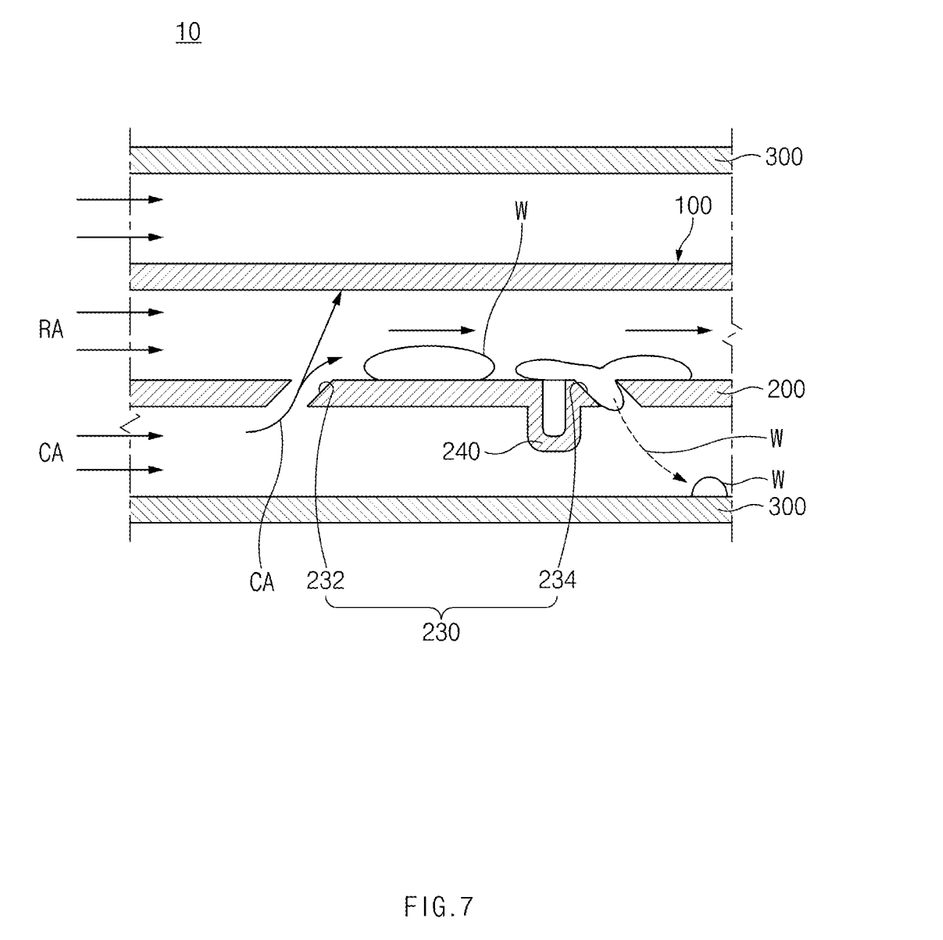
FIG. 7 is a view for explaining a second protrusion pattern of the fuel cell stack according to another embodiment of the present disclosure.

Referring to FIGS. 5 to 7, according to another exemplary embodiment of the present disclosure, the fuel cell stack 10 may be configured to operate in the high-current density region, the reactant gas RA in the reaction channel 210 may flow in the first direction D1 (from the left side to the right side based on FIG. 5), and the cooling gas CA in the cooling channel 220 may flow in the first direction D1 (from the left side to the right side based on FIG. 5).

In addition, according to another exemplary embodiment of the present disclosure, the inclined guide holes 230 may include a first inclined guide hole 232 and a second inclined guide hole 234. The first inclined guide hole 232 may be formed through the first separator 200 and inclined upward with respect to the direction in which the cooling gas CA flows in the cooling channel 220, based on the cooling channel 220 positioned below the reaction channel 210. The second inclined guide hole 234 may be positioned downstream from the first inclined guide hole 232 in the direction in which the reactant gas RA in the reaction channel 210. The second inclined guide hole 234 may be formed through the first separator 200 and inclined downward with respect to the direction in which the reactant gas RA flows in the reaction channel 210, based on the cooling channel 220 positioned below the reaction channel 210.

In this case, the configuration in which the first inclined guide hole 232 is inclined upward with respect to the direction in which the cooling gas CA flows in the cooling channel 220, based on the cooling channel 220 positioned below the reaction channel 210 may be understood as a configuration in which the first inclined guide hole 232 is inclined (inclined upward and rightward based on FIG. 5) so that an outlet end of the first inclined guide hole 232 is positioned downstream from an inlet end of the first inclined guide hole 232 in the direction in which the cooling gas CA flows in the cooling channel 220.

In addition, the configuration in which the second inclined guide hole 234 is inclined downward with respect to the direction in which the reactant gas RA flows in the reaction channel 210, based on the cooling channel 220 positioned below the reaction channel 210 may be understood as a configuration in which the second inclined guide hole 234 is inclined (inclined downward and rightward based on FIG. 5) so that an outlet end of the second inclined guide hole 234 is positioned downstream from an inlet end of the second inclined guide hole 234 in the direction in which the reactant gas RA flows in the reaction channel 210.

The first inclined guide hole 232 is configured to supply the reaction channel 210 with a part of the cooling gas CA that flows along the cooling channel 220. The second inclined guide hole 234 is configured to discharge the condensate water W, which is produced in the reaction channel 210, to the cooling channel 220. The present disclosure is not restricted or limited by the structure of the first and second inclined guide holes 232 and 234 and the number of first and second inclined guide holes 232 and 234.

For example, the first and second inclined guide holes 232 and 234 may each be provided in the form of a circular hole having a circular cross-section. The plurality of first inclined guide holes 232 and the plurality of second inclined guide holes 234 may be provided in all the sections of the reaction channels 210 and spaced apart from one another in the longitudinal direction of the reaction channel 210.

According to another embodiment of the present disclosure, the first and second inclined guide holes 232 and 234 may each have a quadrangular cross-section or other cross-sectional shapes.

Further, in the embodiment of the present disclosure illustrated and described above, the example has been described in which the first and second inclined guide holes 232 and 234 are provided in all the sections of the reaction channels 210. However, according to another embodiment of the present disclosure, the first and second inclined guide holes 232 and 234 may be partially provided only in a particular section of the reaction channel (e.g., a section disposed adjacent to the outlet end of the reaction channel).

As described above, in the embodiment of the present disclosure, the first inclined guide hole 232 is provided in the first separator 200, and a part of the cooling gas CA flowing along the cooling channel 220 is supplied to the reaction channel 210 via the first inclined guide hole 232, such that the cooling gas CA (cold air) may come into direct contact with the membrane electrode assembly 100 and cool the membrane electrode assembly 100. Therefore, it is possible to obtain an advantageous effect of inhibiting overheating of the membrane electrode assembly 100 and improving the performance and operational efficiency of the fuel cell stack 10.

In addition, in the embodiment of the present disclosure, the second inclined guide hole 234 is provided in the first separator 200, and the condensate water W produced in the reaction channel 210 is discharged to the cooling channel 220 via the second inclined guide hole 234. Therefore, it is possible to obtain an advantageous effect of inhibiting flooding caused by the excessive amount of condensate water W produced in the reaction channel 210 and improving the performance and operational efficiency of the fuel cell stack 10.

This is based on the fact that when the fuel cell stack 10 operates in the high-current density region, the flooding may occur because the production amount of condensate water W is relatively large. In the embodiment of the present disclosure, the condensate water W produced in the reaction channel 210 is discharged to the cooling channel 220 via the second inclined guide hole 234. Therefore, it is possible to obtain an advantageous effect of inhibiting the flooding caused by the excessive amount of condensate water W and improving the performance and operational efficiency of the fuel cell stack 10.

Referring to FIG. 6, according to the exemplary embodiment of the present disclosure, the fuel cell stack 10 may include the second separator 300 (anode separator) stacked on the first separator 200 while facing the cooling channels 220 and include the first protrusion patterns 310 arranged at positions corresponding to positions of the respective first inclined guide holes 232 and protruding from one surface (the upper surface based on FIG. 6) of the second separator 300 that faces the first separator 200.

The first protrusion pattern 310 may have various structures in accordance with required conditions and design specifications. The present disclosure is not restricted or limited by the structure of the first protrusion pattern 310 and the number of first protrusion patterns 310.

For example, the first protrusion pattern 310 may be disposed below the first inclined guide hole 232 and provided in the form of an approximately straight protrusion.

According to another embodiment of the present disclosure, the first protrusion pattern may have an inclined surface, and the cooling gas, which comes into contact with the first protrusion pattern 310, may be introduced into the first inclined guide hole 232 along the inclined surface.

The first protrusion pattern 310 may be provided in various ways in accordance with required conditions and design specifications.

According to the exemplary embodiment of the present disclosure, the first protrusion pattern 310 may be provided by partially processing (e.g., forming) a part of the second separator 300.

Because the first protrusion pattern 310 is provided by partially forming a part of the second separator 300 (for example, made of a metallic material) as described above, it is possible to obtain an advantageous effect of simplifying the structure and manufacturing process and reducing costs required to provide the first protrusion pattern 310.

According to another embodiment of the present disclosure, the first protrusion pattern 310 may be separately manufactured and then attached or coupled to the second separator.

As described above, in the embodiment of the present disclosure, the first protrusion pattern 310 is disposed below the first inclined guide hole 232 based on the cooling channel 220 positioned below the reaction channel 210, such that a flow velocity and momentum of the cooling gas CA (cold air) supplied to the reaction channel 210 via the first inclined guide hole 232 may be increased. Therefore, it is possible to obtain an advantageous effect of further improving a cooling effect implemented by the cooling gas CA and further improving an effect of delaying the discharge of the condensate water W.

Referring to FIG. 7, according to the exemplary embodiment of the present disclosure, the fuel cell stack 10 may include a second protrusion pattern 240 disposed adjacent to the second inclined guide hole 234 and protruding from the other surface (the lower surface based on FIG. 7) of the first separator 200.

The second protrusion pattern 240 may have various structures in accordance with required conditions and design specifications. The present disclosure is not restricted or limited by the structure of the second protrusion pattern 240 and the number of second protrusion patterns 240.

For example, the second protrusion pattern 240 may be provided in the form of an approximately straight protrusion and disposed adjacent to the second inclined guide hole 234 (e.g., positioned upstream from the second inclined guide hole 234 in the flow direction of the cooling gas CA).

According to another embodiment of the present disclosure, the second protrusion pattern 240 may be provided on the second separator 300 instead of the first separator 200.

The second protrusion pattern 240 may be provided in various ways in accordance with required conditions and design specifications.

According to the exemplary embodiment of the present disclosure, the second protrusion pattern 240 may be provided by partially processing (e.g., forming) a part of the first separator 200.

Because the second protrusion pattern 240 is provided by partially forming a part of the first separator 200 (for example, made of a metallic material) as described above, it is possible to obtain an advantageous effect of simplifying the structure and manufacturing process and reducing costs required to provide the second protrusion pattern 240.

According to another embodiment of the present disclosure, the second protrusion pattern 240 may be separately manufactured and then attached or coupled to the first separator 200.

As described above, in the embodiment of the present disclosure, the second protrusion pattern 240 is disposed adjacent to the second inclined guide hole 234, such that pressure at the periphery of the outlet end of the second inclined guide hole 234 (a region downstream from the second protrusion pattern) may be decreased on the basis of the Bernoulli's principle, which may ensure a smooth discharge of the condensate water W. Therefore, it is possible to obtain an advantageous effect of further improving efficiency in discharging the condensate water W from the reaction channel 210 to the cooling channel 220.

According to the embodiment of the present disclosure described above, it is possible to obtain an advantageous effect of improving the performance (output) and operational efficiency of the fuel cell stack.

In particular, according to the embodiment of the present disclosure, it is possible to obtain an advantageous effect of ensuring the cooling performance and cooling efficiency and improving the performance and operational efficiency of the fuel cell stack.

Among other things, according to the embodiment of the present disclosure, the cooling gas may be used to maintain appropriate humidity of the membrane electrode assembly, minimize a degree to which the membrane electrode assembly is dried, and minimize flooding.

In addition, according to the exemplary embodiment of the present disclosure, it is possible to obtain an advantageous effect of minimizing deformation of and damage to the membrane electrode assembly and improving durability.

In addition, according to the embodiment of the present disclosure, it is possible to obtain an advantageous effect of simplifying the structure and the manufacturing process and reducing the manufacturing costs.

In addition, according to the embodiment of the present disclosure, it is possible to obtain an advantageous effect of improving stability and reliability.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A fuel cell stack comprising:
   a membrane electrode assembly (MEA);
   a first separator stacked on the MEA and including a reaction channel disposed on one surface of the first separator facing the MEA and configured to allow a reactant gas to flow therethrough, and a cooling channel disposed on the other surface of the first separator and configured to allow a cooling gas to flow therethrough; and
   inclined guide holes formed through the first separator and inclined with respect to a thickness direction of the first separator, the inclined guide holes each having one end communicating with the cooling channel and the other end communicating with the reaction channel.

2. The fuel cell stack of claim 1, wherein at least one of the inclined guide holes is inclined upward with respect to a direction in which the cooling gas flows in the cooling channel, based on the cooling channel positioned below the reaction channel, and
   wherein a part of the cooling gas flowing along the cooling channel is supplied to the reaction channel via at least one of the inclined guide holes.

3. The fuel cell stack of claim 1, comprising:
a second separator stacked on the first separator while facing the cooling channel.

4. The fuel cell stack of claim 3, comprising:
a first protrusion pattern arranged at a position corresponding to a position of one of the inclined guide holes and protruding from one surface of the second separator that faces the first separator.

5. The fuel cell stack of claim 4, wherein the first protrusion pattern is a part of the second separator.

6. The fuel cell stack of claim 1, wherein the reactant gas in the reaction channel flows in a first direction, and
wherein the cooling gas in the cooling channel flows in a second direction opposite to the first direction.

7. The fuel cell stack of claim 1, wherein the inclined guide holes comprise:
a first inclined guide hole formed through the first separator and inclined upward with respect to a direction in which the cooling gas flows in the cooling channel, based on the cooling channel positioned below the reaction channel; and
a second inclined guide hole positioned downstream from the first inclined guide hole in the direction in which the reactant gas flows in the reaction channel, the second inclined guide hole being formed through the first separator and inclined downward with respect to the direction in which the reactant gas flows in the reaction channel, based on the cooling channel positioned below the reaction channel.

8. The fuel cell stack of claim 7, wherein the reactant gas in the reaction channel flows in a first direction, and
wherein the cooling gas in the cooling channel flows in the first direction.

9. The fuel cell stack of claim 7, comprising:
a second separator stacked on the first separator while facing the cooling channel; and
a first protrusion pattern arranged at a position corresponding to a position of the first inclined guide hole and protruding from one surface of the second separator that faces the first separator.

10. The fuel cell stack of claim 9, wherein the first protrusion pattern is a part of the second separator.

11. The fuel cell stack of claim 7, comprising:
a second protrusion pattern disposed adjacent to the second inclined guide hole and protruding from the other surface of the first separator.

12. The fuel cell stack of claim 11, wherein the second protrusion pattern is a part of the first separator.

* * * * *